United States Patent
Saito et al.

(10) Patent No.: US 10,809,051 B2
(45) Date of Patent: Oct. 20, 2020

(54) DEBONDING DETECTING METHOD AND DEBONDING DETECTING DEVICE

(71) Applicant: MITSUBISHI HEAVY INDUSTRIES, LTD., Tokyo (JP)

(72) Inventors: Nozomi Saito, Tokyo (JP); Takayuki Shimizu, Tokyo (JP); Kiyoka Takagi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 32 days.

(21) Appl. No.: 16/094,142

(22) PCT Filed: Mar. 16, 2017

(86) PCT No.: PCT/JP2017/010783
§ 371 (c)(1),
(2) Date: Oct. 16, 2018

(87) PCT Pub. No.: WO2017/183373
PCT Pub. Date: Oct. 26, 2017

(65) Prior Publication Data
US 2019/0128662 A1 May 2, 2019

(30) Foreign Application Priority Data

Apr. 18, 2016 (JP) ................... 2016-083096

(51) Int. Cl.
*G01M 5/00* (2006.01)
*G01N 9/04* (2006.01)
(Continued)

(52) U.S. Cl.
CPC ............. *G01B 11/16* (2013.01); *G01D 5/353* (2013.01); *G01M 5/0033* (2013.01);
(Continued)

(58) Field of Classification Search
CPC ......... G01N 2291/02827; G01N 19/00; G01N 2203/0296; G01N 1/2208;
(Continued)

(56) References Cited

U.S. PATENT DOCUMENTS 5,841,034 A * 11/1998 Ball ..................... G01M 11/086
73/800
9,261,444 B1 2/2016 Sutherland et al.
(Continued)

FOREIGN PATENT DOCUMENTS

EP 0 573 778 12/1993
EP 0 757 238 2/1997
(Continued)

OTHER PUBLICATIONS

International Search Report dated Jun. 20, 2017 in International (PCT) Application No. PCT/JP2017/010783.
(Continued)

*Primary Examiner* — Brandi N Hopkins
(74) *Attorney, Agent, or Firm* — Wenderoth, Lind & Ponack, L.L.P.

(57) ABSTRACT

A debonding detecting method detects debonding of an adhering portion at which an adhering object adheres to an adherend. An optical fiber sensor is provided on the adherend adjacent to the adhering object. A longitudinal direction of the optical fiber sensor is along a direction in which the adhering object extends. Reference strain data of a strain measured by the optical fiber sensor is prepared in advance (Continued)

when a load is applied to the adherend in a reference state in which debonding of the adhering portion does not occur. The debonding detecting method includes: applying a load to the adherend; measuring a strain of the adherend by the optical fiber sensor; and the determining presence or absence of debonding based on comparison result obtained by comparing measured strain data measured in the measuring and the reference strain data.

10 Claims, 6 Drawing Sheets

(51) Int. Cl.
*G01B 11/16* (2006.01)
*G01D 5/353* (2006.01)
*G01M 11/08* (2006.01)
*G01N 19/04* (2006.01)

(52) U.S. Cl.
CPC ........ *G01M 5/0091* (2013.01); *G01M 11/086* (2013.01); *G01N 19/04* (2013.01)

(58) Field of Classification Search
CPC ... G01N 2203/0051; G01N 2291/0258; G01N 19/04; G01N 3/30; G01N 29/2474; G01N 2203/0246; G01N 21/954; G01L 5/008; G01M 5/0033; G01M 11/086; B29C 65/823; B29C 65/8292
See application file for complete search history.

(56) References Cited

U.S. PATENT DOCUMENTS

| 2004/0206893 | A1  | 10/2004 | Sato |
| 2006/0140532 | A1* | 6/2006  | Menendez Martin ....................... G01M 11/085 385/13 |
| 2007/0237448 | A1* | 10/2007 | Sato ..................... G01M 11/086 385/13 |
| 2008/0008385 | A1  | 1/2008  | Ogisu |

FOREIGN PATENT DOCUMENTS

| EP | 1 677 091 | 7/2006 |
| JP | 9-101255 | 4/1997 |
| JP | 2001-21384 | 1/2001 |
| JP | 2007-333517 | 12/2007 |
| WO | 2014/080677 | 5/2014 |

OTHER PUBLICATIONS

Extended European Search Report dated Feb. 22, 2019 in European Application No. 17785715.8.
I. Herszberg et al., "Damage assessment and monitoring of composite ship joints", Composite Structures, Elsevier Science Ltd., vol. 67, No. 2, Feb. 1, 2005, pp. 205-216, XP027651478.
Sanne Sulejmani et al., "Disbond monitoring in adhesive joints using shear stress optical fiber sensors", Smart Materials and Structures, IOP Publishing, vol. 23, No. 7, May 30, 2014, XP02026933.

* cited by examiner

DEBONDING DETECTING METHOD AND DEBONDING DETECTING DEVICE

TECHNICAL FIELD

The present invention relates to a debonding detecting method and a debonding detecting device, which use an optical fiber sensor.

BACKGROUND ART

In the related art, there has been known a debonding detecting method of detecting presence or absence of debonding and a position at which the debonding occurs, through use of an optical fiber sensor (for example, see JP 2001-21384 A). In this debonding detecting method, an optical fiber sensor is fixed to each of two members, and a strain measurement device is connected to one end of each optical fiber sensor. Further, in the debonding detecting method, presence or absence of debonding and a position at which the debonding occurs are detected using a value obtained by subtracting a strain obtained by one optical fiber sensor from a strain obtained by another optical fiber sensor.

However, in JP 2001-21384 A, the optical fiber sensor is provided on each of the two members. Accordingly, optical fiber sensor weight is not easily reduced, and the device configuration is not easily simplified. Further, when debonding is detected using data of two strains measured by two optical fiber sensors, the two optical fiber sensors are provided on the two members, respectively. Thus, in order to perform matching of the data of two strains, there may be a possibility that at least one of the data of the two strains is required to be adjusted.

In view of the above, an object of the present invention is to provide a debonding detecting method and a debonding detecting device, which are capable of suitably detecting debonding of an adhering portion with a simple configuration in which weight increase is suppressed.

SUMMARY OF THE INVENTION

In a debonding detecting method of the present invention, debonding of an adhering portion at which an adhering object adheres to an adherend is detected. In the debonding detecting method, an optical fiber sensor is provided on the adherend so as to be adjacent to the adhering object. The optical fiber sensor is provided so that a longitudinal direction of the optical fiber sensor is along a direction in which the adhering object extends. Reference strain data of a strain measured by the optical fiber sensor is prepared in advance when a load is applied to the adherend in a reference state in which debonding of the adhering portion does not occur. The debonding detecting method includes a load applying step in which a load is applied to the adherend, a strain measuring step in which the optical fiber sensor measures a strain of the adherend, and a debonding determining step in which the presence or absence of debonding is determined based on a comparison result obtained by comparing measured strain data measured in the strain measuring step and the reference strain data.

Further, a debonding detecting device of the present invention is configured to detect debonding of an adhering portion at which an adhering object adheres to an adherend. The debonding detecting device includes an optical fiber sensor, which is provided on the adherend and is provided adjacent to the adhering object so that a longitudinal direction of the optical fiber sensor is a direction in which the adhering object extends. The debonding detecting device also includes a processing unit configured to acquire reference strain data of a strain measured by the optical fiber sensor when a load is applied to the adherend in a reference state in which debonding of the adhering portion does not occur, acquire measured strain data of a strain measured by the optical fiber sensor when a load is applied to the adherend at a time of debonding measurement, compare the reference strain data and the measured strain data, which are acquired, and determine the presence or absence of debonding based on the comparison result.

With these configurations, the measured strain data obtained by the optical fiber sensor provided on the adherend is compared with the reference strain data prepared in advance, and based on the comparison result, presence or absence of the debonding can suitably be determined. In this case, the optical fiber sensor is only required to be provided on the adherend, and hence is not required to be provided on (is apart from) the adhering object. Thus, increase in weight can be suppressed. Further, a configuration for debonding detection can be simplified. Note that, a way of applying a load applied to the adherend at the time of acquiring the reference strain data and a way of applying a load applied to the adherend at the time of acquiring the measured strain data may be the same. In this case, when the reference strain data and the measured strain data are compared with each other, processes such as normalization or adjustment of the respective data are not required to be performed. Accordingly, the reference strain data and the measured strain data can easily be compared with each other.

Further, in the debonding determining step, it is preferably determined whether the measured strain data includes a bending point at which a change amount of the strain which changes in accordance with a position of the optical fiber sensor in the longitudinal direction is larger than a set change amount which is a threshold value set in advance. In a case where it is determined that the measured strain data include the bending point, when a position of the bending point of the measured strain data in the longitudinal direction is not the same as a position of the bending point of the reference strain data in the longitudinal direction, it is preferably determined that debonding is present, and the position of the bending point of the measured strain data in the longitudinal direction is preferably detected as a progression position of the debonding.

Further, the processing unit preferably determines whether the measured strain data includes a bending point at which a change amount of the strain which changes in accordance with a position of the optical fiber sensor in the longitudinal direction is larger than a set change amount which is a threshold value set in advance. In a case where the processing unit determines that the measured strain data include the bending point, when a position of the bending point of the measured strain data in the longitudinal direction is not the same as a position of the bending point of the reference strain data in the longitudinal direction, the processing unit preferably determines that debonding is present, and preferably detects the position of the bending point of the measured strain data in the longitudinal direction as a progression position of the debonding.

With these configurations, based on the position of the bending point in the longitudinal direction included in the measured strain data, the debonding can be detected with high accuracy, and the progression position of the debonding can be detected. Note that, the change amount of the strain may be a difference between a front position and a rear position with respect to a predetermined position of the optical fiber sensor in the longitudinal direction or a differential value (first order differential) at the predetermined position, and is not particularly limited.

Further, the adherend is preferably a reinforced member, and the adhering object is preferably a reinforcing member.

With this configuration, debonding of the reinforcing member with respect to the reinforced member can be detected.

Further, in the load applying step, a bending load is preferably applied to the adherend so that the optical fiber sensor extending in the longitudinal direction is curved.

With this structure, debonding with respect to the adherend at the time of applying a bending load can be detected.

Further, in the load applying step, a tensile force is preferably applied to the adherend so that the optical fiber sensor is pulled in the longitudinal direction.

With this configuration, debonding with respect to the adherend at the time of applying a tensile load can be detected.

Further, in the load applying step, a compression load is preferably applied to the adherend so that the optical fiber sensor is contracted in the longitudinal direction.

With this configuration, debonding with respect to the adherend at the time of applying a compression load can be detected.

DETAILED DESCRIPTION OF EMBODIMENTS

Now, with reference to the drawings, detailed description is made of an embodiment according to the present invention. Note that the invention is not limited by this embodiment. In addition, the constituent elements in the embodiment described below include those that can be easily replaced by a person skilled in the art or those that are substantially the same. Further, the constituent elements described below can be combined as appropriate, and in case of a plurality of embodiments, the embodiments can be combined with one another.

EMBODIMENT

A debonding detecting device 1 according to the present embodiment is configured to detect occurrence of debonding of an adhering structure 10 subjected to debonding detection and to detect a progression state of the debonding. First, with reference to FIG. 1, description is made of the adhering structure 10.

Figure 1:
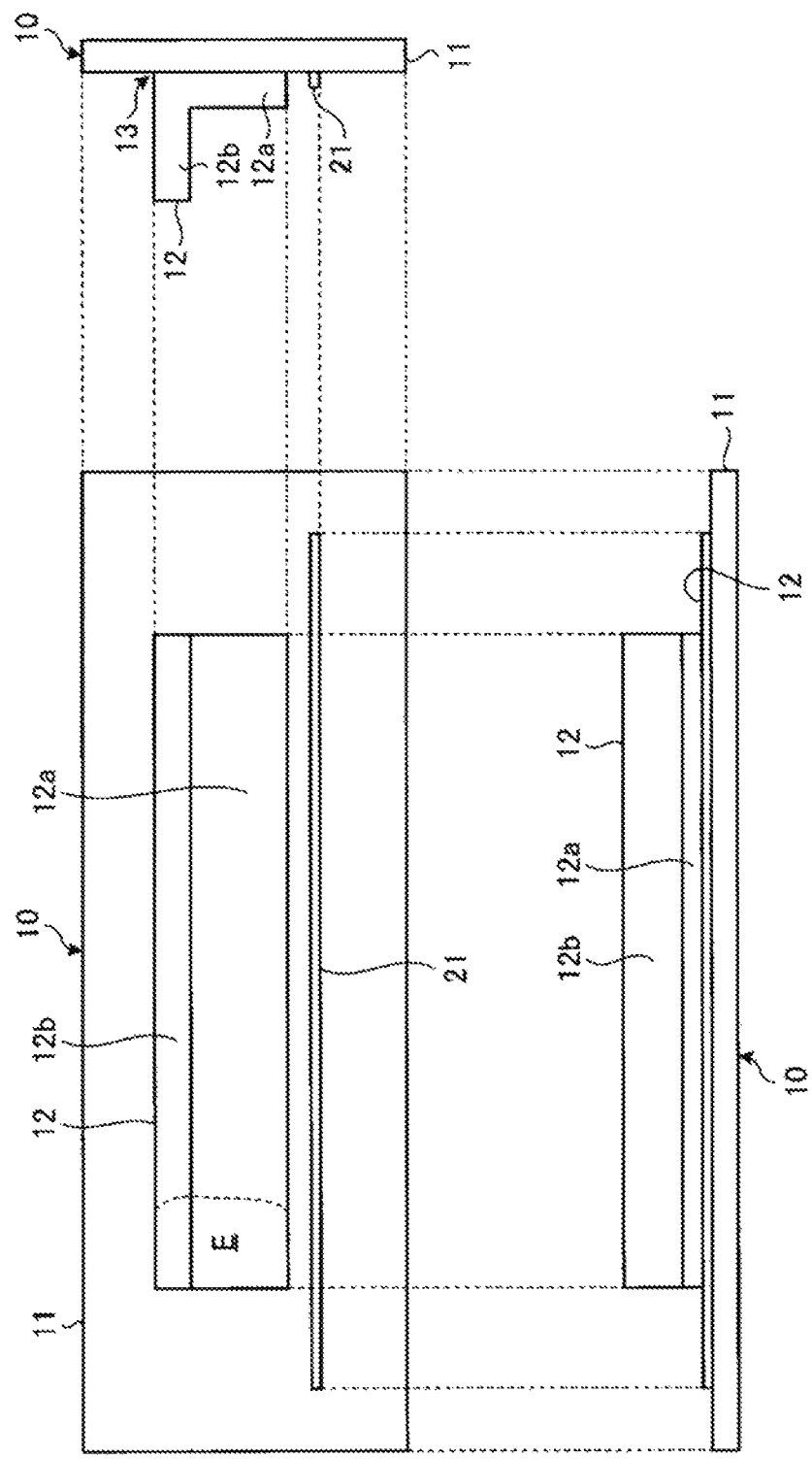
FIG. 1 is a view of an example of an adhering structure subjected to a debonding detection performed by a debonding detecting device according to the present embodiment.

The adhering structure 10 is a structure constituting, for example, an aircraft fuselage or a vane body or the like. Note that, in the present embodiment, the adhering structure 10 is described as a structure of an aircraft. However, the adhering structure 10 is not limited to a structure of an aircraft, and may be any structure. As illustrated in FIG. 1, the adhering structure 10 includes a skin 11 (adherend) being a reinforced member, a stringer 12 (adhering object) being a reinforcing member, and an adhering portion 13 being an adhesive layer between the skin 11 and the stringer 12. Note that, in FIG. 1, for easy understanding of the description, the skin 11 and the stringer 12 are illustrated as simple structures.

The skin 11 is formed into a plate-like shape as an outer plate of an aircraft, and is an object to which the stringer 12 adheres. The skin 11 includes one surface as an inner surface and the other surface as an outer surface. Further, the stringer 12 adheres to the inner surface of the skin 11. As indicated in FIG. 1, an optical fiber sensor 21 of the debonding detecting device 1, which is described later, is provided on the same surface side of the skin (adherend) 11 as the stringer (adhering object) 12, and is located at a position spaced apart from the stringer 12 (adhering object).

The stringer 12 is an adhering object adhering to the skin 11 (adherend), and is formed so as to extend in a longitudinal direction. The stringer 12 is provided on the skin 11 so that the longitudinal direction is a predetermined direction. The stringer 12 has, for example, an L-shaped cross section taken along a surface orthogonal to the longitudinal direction. That is, the stringer 12 formed into an L-shape by an adhering part 12a, which includes a surface adhering to the skin 11, and a protruding part 12b, which protrudes from an end of the adhering part 12a in a direction orthogonal to the inner surface of the skin 11.

The adhering portion 13 causes the adhering part 12a of the stringer 12 to adhere to the inner surface of the skin 11 so that the skin 11 and the stringer 12 are strongly bonded and integrated.

Figure 2:
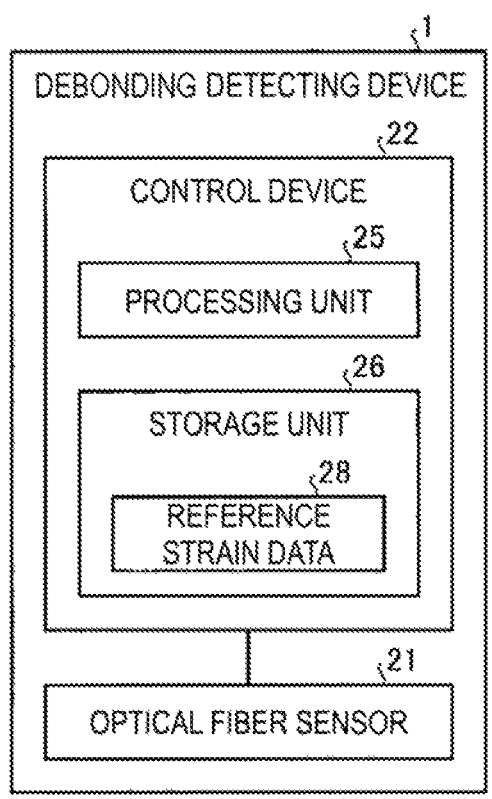
FIG. 2 is a control block diagram of a debonding detecting device according to the present embodiment.

Next, with reference to FIG. 1 and FIG. 2, description is made of the debonding detecting device 1. In the adhering structure 10 as described above, the debonding detecting device 1 is configured to detect the occurrence of debonding of the adhering portion 13 and to detect a progression state of the debonding having occurred in order to monitor soundness of the adhering portion 13. As illustrated in FIG. 2, the debonding detecting device 1 includes the optical fiber sensor 21, which is provided on the adhering structure 10, and a control device 22.

The optical fiber sensor 21 is provided on the skin 11 so as to be adjacent to, and apart from the edge of, the stringer 12. The optical fiber sensor 21 is formed into a long linear shape in a longitudinal direction, and is formed so that the longitudinal direction of the optical fiber sensor 21 is parallel to the longitudinal direction of the stringer 12. This optical fiber sensor 21 is capable of measuring a strain at a predetermined position in the longitudinal direction.

Further, the optical fiber sensor 21 has a length in the longitudinal direction, which is longer than the stringer 12, and is provided so as to protrude outward from both ends of the stringer 12 in the longitudinal direction. In this case, a part of the optical fiber sensor 21 is provided on a non-influenced part 11a of the skin 11 where influence of the debonding of the adhering portion 13 can be neglected. Specifically, the non-influenced part 11a is, for example, a part in a vicinity of a load application point P in a load applying step S1 in a debonding detecting method described later (see FIG. 4). Further, the optical fiber sensor 21 is provided so that parts protruding outward from the stringer 12 extend to the non-influenced part 11a.

As illustrated in FIG. 2, the control device 22 includes a processing unit 25 and a storage unit 26, and is connected to the optical fiber sensor 21.

The processing unit 25 includes an integrated circuit such as a central processing unit (CPU), and a memory being a work area, and executes various processes by executing a program for detecting debonding through use of these hardware resources. Specifically, the processing unit 25 reads a program stored in the storage unit 26, deploys the program in the memory, and causes the CPU to execute commands included in the program deployed in the memory, to execute various processes.

The storage unit 26 includes a non-volatile storage such as a magnetic storage and a semiconductor storage, and stores various programs for detecting debonding and various data to be used for detecting debonding. The data stored in the storage unit 26 includes reference strain data 28. The reference strain data 28 is data of a strain measured by the optical fiber sensor 21 at the time when a load is applied to the skin 11 in a reference state in which debonding of the adhering portion 13 does not occur. The reference strain data 28 is data which is derived from tests, analyses, or the like in advance and prepared before debonding detection performed by the debonding detecting device 1.

Figure 3:
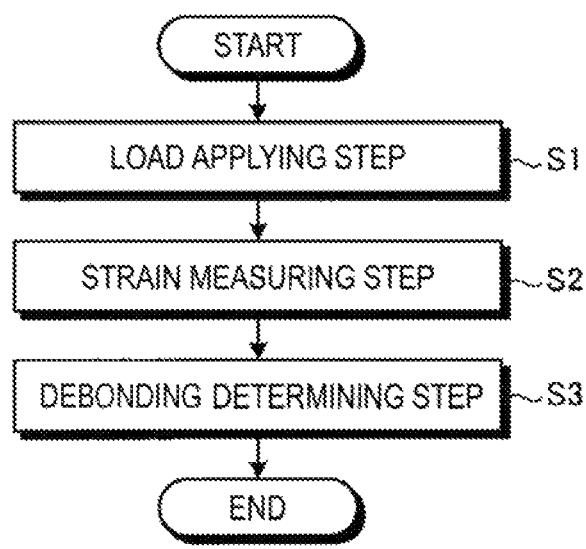
FIG. 3 is a flowchart of a debonding detecting method according to the present embodiment.
Figure 4:
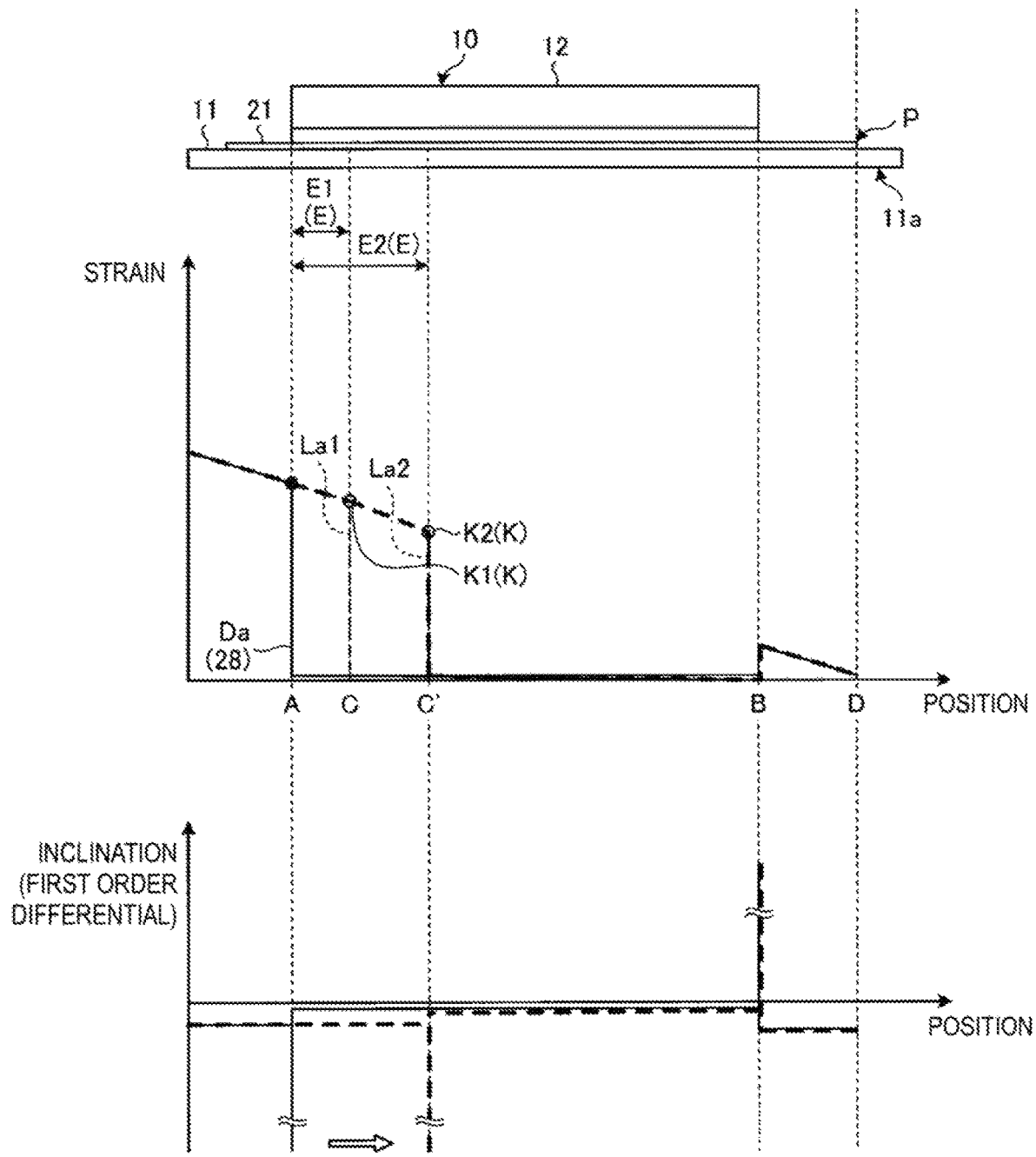
FIG. 4 is a graph illustrating an example of reference strain data and measured strain data.

Next, with reference to FIG. 3 and FIG. 4, description is made of the debonding detecting method of detecting debonding of the adhering structure 10 through use of the debonding detecting device 1 described above. Note that, in the following description, a case where debonding occurs to the adhering portion 13 of the adhering structure 10 is described. As illustrated in FIG. 1 and FIG. 4, a debonding region E is formed in the adhering portion 13 of the adhering structure 10. This debonding region E progresses from one end to the other end of the stringer 12 in the longitudinal direction. In the debonding detecting method illustrated in FIG. 3, the load applying step S1, a strain measuring step S2, and a debonding determining step S3 are sequentially performed.

The load applying step S1 is a step in which a load is applied to the skin 11. In the load applying step S1, a bending load is applied to the skin 11 so that the optical fiber sensor 21 extending in the longitudinal direction is curved. Specifically, in FIG. 4, in the load applying step S1, one end (left end) of the skin 11 in the longitudinal direction is a fixed point, and the other end (right end) of the skin 11 is the load application point P. Note that, in FIG. 4, a bending load is applied, but a load applied for debonding detection is not particularly limited. For example, a tensile load that pulls the skin 11 in the longitudinal direction may be applied (as described later in detail), and a compression load that contracts the skin 11 in the longitudinal direction may be applied.

The strain measuring step S2 is a step in which a strain of the skin 11 in a load-applied state is measured by the optical fiber sensor 21. The optical fiber sensor 21 continuously measures a strain in the longitudinal direction, that is, measures a strain in the longitudinal direction with high resolution. The processing unit 25 acquires data of a strain measured by the optical fiber sensor 21 as measured strain data.

Here, in the graph illustrated in FIG. 4, the transverse axis indicates a position in the longitudinal direction, and the vertical axis indicates a strain. On the transverse axis, a position A is a position of one end (left end) of the stringer 12, and a position B is a position of the other end (right end) of the stringer 12. A position C is a position (progression position) of a distal end of the progressing debonding region E and a progression position at which the debonding region E progresses to be a debonding region E1. A position C' is a progression position at which the debonding region E further progresses from the position C (progresses to be a debonding region E2). Further, a position D is a position of the load application point P.

Strain data measured in the strain measuring step S2 is La1 and La2 in FIG. 4. Measured strain data La1 is data at the time when the debonding region E progresses to be the debonding region E1. Measured strain data La2 is data at the time when the debonding region E progresses to be the debonding region E2.

The debonding determining step S3 is a step of comparing the measured strain data La1 (or the measured strain data La2) obtained in the strain measuring step S2 and the reference strain data 28 stored in the storage unit 26 to each other at the processing unit 25 and of determining the presence or absence of debonding based on the comparison result.

Here, reference strain data 28 is Da in FIG. 4. Reference strain data Da is data at the time when a certain load is applied to the load application point P. The load may be a maximum load or a minimum load to be applied to the load application point, and a magnitude of the load is not particularly limited.

Specifically, in the debonding determining step S3, the processing unit 25 determines whether the measured strain data La1 and La2 include a bending point K at which a change amount of a strain that changes in accordance with a position of the optical fiber sensor 21 in the longitudinal direction is larger than a set change amount that is a threshold value set in advance. Here, the change amount is, for example, a differential value (inclination) of a first order differential for a strain at a predetermined position in the longitudinal direction. When the differential value is greater than a set differential value that is a threshold value, the strain at the position in the longitudinal direction, which has the differential value greater than the set differential value, is determined as the bending point K of the strain. Note that, the change amount of the strain is not limited to a differential value, and may be a difference between strains at a front position and a rear position in the longitudinal direction. Note that, in FIG. 4, a bending point in the measured strain data La1 is K1, and a bending point in the measured strain data La2 is K2. Accordingly, determination is performed.

In the debonding determining step S3, when the processing unit 25 determines that the measured strain data La1 and La2 include bending points K1 and K2, comparison is made between the position of the bending point of the reference strain data Da in the longitudinal direction and the positions of the bending points K1 and K2 of the measured strain data La1 and La2 in the longitudinal direction. When the position of the bending point of the reference strain data Da and the positions of the bending points K1 and K2 of the measured strain data La1 and La2 are not the same, the processing unit 25 determines that debonding is present. Meanwhile, when the position of the bending point of the reference strain data Da and the positions of the bending points K1 and K2 of the measured strain data La1 and La2 are the same, the processing unit 25 determines that debonding is absent.

Further, in the debonding determining step S3, when the processing unit 25 determines that debonding is present, the positions of the bending points K1 and K2 are determined as progression positions of the debonding. In this manner, in the debonding determining step S3, presence or absence of the occurrence of debonding and the progression positions at the time when the debonding occurs are detected.

As described above, according to the present embodiment, the measured strain data La1 and La2 obtained by the optical fiber sensor 21 provided on the skin 11 is compared with the reference strain data 28 prepared in advance, and based on the comparison result, presence or absence of the debonding can suitably be determined. In this case, the optical fiber sensor 21 is only required to be provided on the skin 11, and hence is not required to be provided on the stringer 12 (i.e., the optical fiber sensor 21 is spaced apart from an edge of the stringer (adhering object) 12. Thus, increase in weight can be suppressed. Further, a configuration for debonding detection can be simplified.

Further, according to the present embodiment, debonding at the time when a bending load is applied to the skin 11 can suitably be detected. Note that, when a load pass given to the skin 11 is one pass, that is, when one stringer 12 adheres to the skin 11, application of the bending load is particularly useful at a time of debonding detection.

Further, according to the present embodiment, comparison is made between the position of the bending point of the reference strain data Da in the longitudinal direction and the positions of the bending points K1 and K2 of the measured strain data La1 and La2 in the longitudinal direction so that presence or absence of debonding can be determined. Thus, regardless of a magnitude of the bending load, the presence or absence of debonding can suitably be detected.

Note that, in the present embodiment, a magnitude of a load applied to the skin 11 at the time of acquiring the reference strain data 28 and a magnitude of a load applied to the skin 11 at the time of acquiring the measured strain data La1 and La2 may be the same. In this case, when the reference strain data 28 and the measured strain data La1 and La2 are compared with each other, processes such as normalization or adjustment of the respective data are not required to be performed. Accordingly, the reference strain data 28 and the measured strain data La1 and La2 can suitably be compared with each other.

Further, in the present embodiment, in the load applying step S1, the bending load is applied to the skin 11. However, a tensile load that pulls the skin 11 in the longitudinal direction may be applied. When a load pass given to the skin 11 is a multi-pass, that is, when a plurality of stringers 12 adhere to the skin 11, application of the tensile load is particularly useful at the time of debonding detection. This is because, when the load pass given to the skin 11 is a multi-pass, even when applying the bending load to the skin 11, the load is also applied to the stringers 12 for which debonding does not occur. For this reason, accuracy of the measured strain data for detecting debonding of the stringers 12 for which debonding occurs is degraded. Now, with reference to FIG. 5 and FIG. 6, description is made of the points which are different between a case of the bending load and a case of the tensile load in the debonding detecting method.

Figure 5:
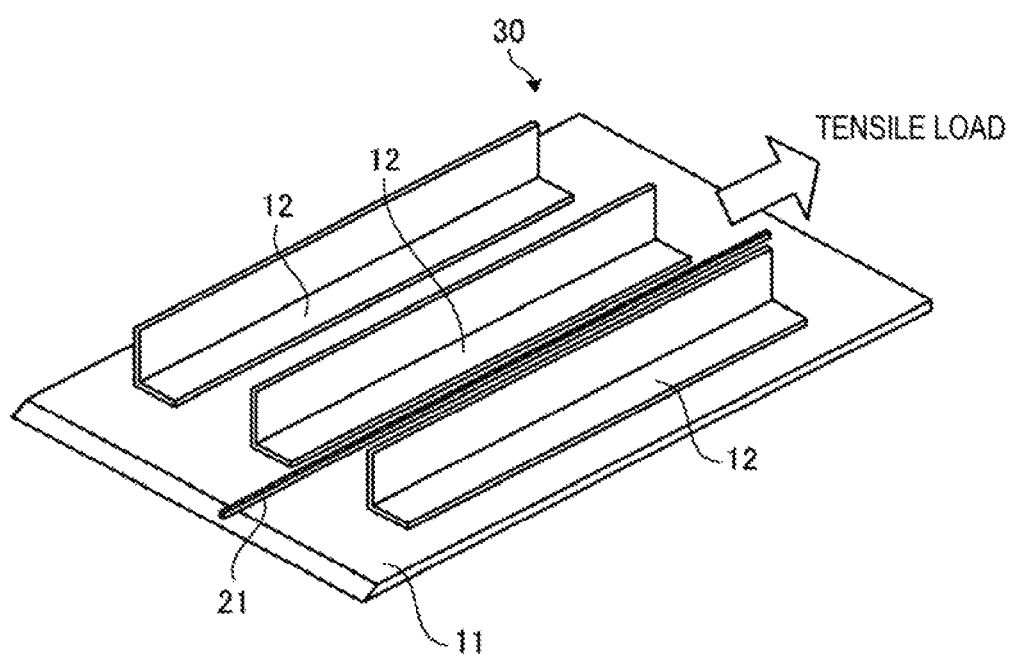
FIG. 5 is a view of an example of an adhering structure subjected to debonding detection performed by a debonding detecting device according to the present embodiment.
Figure 6:
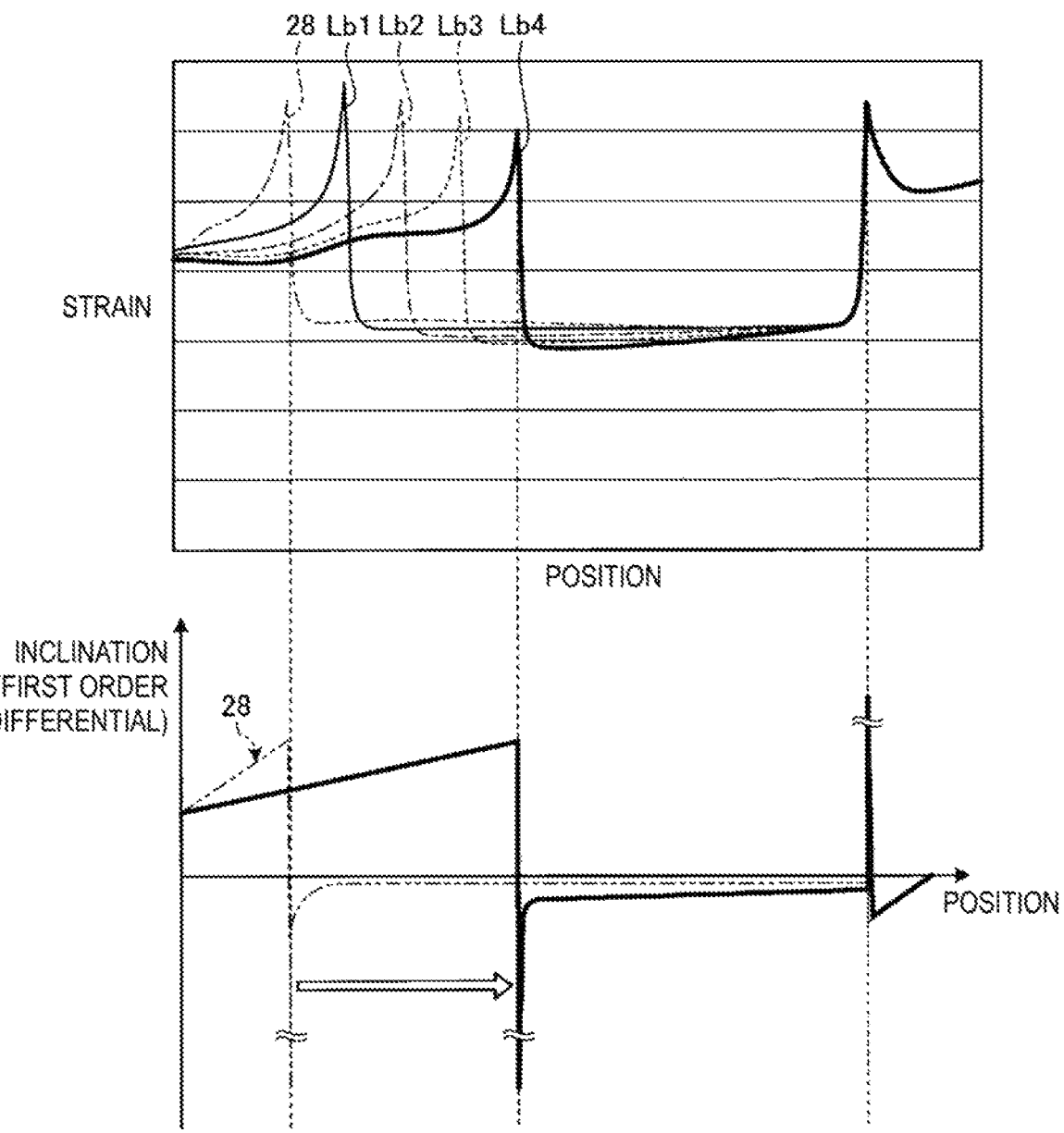
FIG. 6 is a graph illustrating an example of measured strain data.

FIG. 5 is a view of an example of an adhering structure subjected to the debonding detection performed by the debonding detecting device according to the present embodiment. FIG. 6 is a graph illustrating an example of the measured strain data. As illustrated in FIG. 5, an adhering structure 30 includes a plurality (three in FIG. 5) of stringers 12 arranged on the skin 11 so as to be parallel to each other. Similar to FIG. 1, for this adhering structure 30, the optical fiber sensor 21 is oriented along the longitudinal direction so as to be adjacent to the stringers 12 being subjected to debonding detection. Note that, the debonding detecting method is similar to FIG. 3.

In the graph illustrated in FIG. 6, the transverse axis indicates a position in the longitudinal direction, and the vertical axis indicates a strain. Further, in FIG. 6, the reference strain data 28 is illustrated. Measured strain data Lb1, Lb2, Lb3, and Lb4 in FIG. 6 are the measured strain data measured in the strain measuring step S2. The debonding determining step S3 is similar to FIG. 3, and hence description thereof is omitted. Positions of bending points of the measured strain data Lb1, Lb2, Lb3, and Lb4 in the longitudinal direction and the position of the bending point of the reference strain data 28 in the longitudinal direction are compared with each other. Based on the comparison result, presence or absence of debonding is determined. Note that, the measured strain data Lb1, Lb2, Lb3, and Lb4 are data at the time when the debonding progresses from the left side to the right side of FIG. 6.

As described above, in the load applying step S1, even when applying the tensile load to the skin 11, the debonding can suitably be detected. Further, even when the load pass applied to the skin 11 is a multi-pass, that is, when the plurality of stringers 12 adhere to the skin 11, the debonding can suitably be detected.

Note that, in the present embodiment, in the load applying step S1, the bending load or the tensile load is applied to the skin 11. However, a compression load for longitudinal compression may be applied for debonding detection.

REFERENCE SIGNS LIST

1 Debonding detecting device
10, 30 Adhering structure
11 Skin
11a Non-influenced part
12 Stringer
12a Adhering part
12b Protruding part
13 Adhering portion
21 Optical fiber sensor
22 Control device
25 Processing unit
26 Storage unit
28, Da Reference strain data
P Load application point
E, E1, E2 Debonding region
La1, La2, Lb1, Lb2, Lb3, Lb4 Measured strain data
K, K1, K2 Bending point

The invention claimed is:

1. A debonding detecting method of detecting debonding of an adhering portion at which an adhering object adheres to an adherend, in which an optical fiber sensor is at a position apart from an edge of the adhering object on the adherend so as to be adjacent to the adhering object, the optical fiber sensor being provided such that a longitudinal direction of the optical fiber sensor is along a direction in which the adhering object extends, and reference strain data of a strain measured by the optical fiber sensor is prepared in advance when a load is applied to the adherend in a reference state in which debonding of the adhering portion does not occur, the debonding detecting method comprising the steps of:
    applying a load to the adherend;
    measuring a strain of the adherend using the optical fiber sensor; and
    determining a presence or an absence of debonding based on a comparison result obtained by comparing measured strain data measured during the measuring and the reference strain data.

2. The debonding detecting method according to claim 1, wherein
in the determining, it is determined whether the measured strain data includes a bending point at which a change amount of the strain which changes in accordance with a position of the optical fiber sensor in the longitudinal direction is larger than a set change amount which is a threshold value set in advance, and in a case where it is determined that the measured strain data includes the bending point, when a position of the bending point of the measured strain data in the longitudinal direction is not the same as a position of the bending point of the reference strain data in the longitudinal direction, it is determined that debonding is present, and the position of the bending point of the measured strain data in the longitudinal direction is detected as a progression position of the debonding.

3. The debonding detecting method according to claim 1, wherein the adherend comprises a reinforced member, and the adhering object comprises a reinforcing member.

4. The debonding detecting method according to claim 1, wherein, in the applying, a bending load is applied to the adherend such that the optical fiber sensor extending in the longitudinal direction is curved.

5. The debonding detecting method according to claim 1, wherein, in the applying, a tensile load is applied to the adherend such that the optical fiber sensor is pulled in the longitudinal direction.

6. The debonding detecting method according to claim 1, wherein, in the applying, a compression load is applied to the adherend such that the optical fiber sensor is contracted in the longitudinal direction.

7. The debonding detecting method according to claim 1, wherein the adhering object and the optical fiber are to be on a same surface side of the adherent, and the optical fiber sensor is spaced apart from the adhering object.

8. A debonding detecting device configured to detect debonding of an adhering portion at which an adhering object adheres to an adherend, the debonding detecting device comprising:

an optical fiber sensor at a position apart from an edge of the adhering object on the adherend so as to be adjacent to the adhering object such that a longitudinal direction of the optical fiber sensor is a direction in which the adhering object extends; and a processing unit configured to acquire reference strain data of a strain measured by the optical fiber sensor when a load is applied to the adherend in a reference state in which debonding of the adhering portion does not occur, acquire measured strain data of a strain measured by the optical fiber sensor when a load is applied to the adherend at a time of debonding measurement, compare the acquired reference strain data and the measured strain data, and determine a presence or an absence of debonding based on a comparison result.

9. The debonding detecting device according to claim 8, wherein the processing unit is configured to determine whether the measured strain data includes a bending point at which a change amount of the strain which changes in accordance with a position of the optical fiber sensor in the longitudinal direction is larger than a set change amount which is a threshold value set in advance, and in a case where the processing unit determines that the measured strain data includes the bending point, when a position of the bending point of the measured strain data in the longitudinal direction is not the same as a position of the bending point of the reference strain data in the longitudinal direction, the processing unit is configured to determine that debonding is present, and detect the position of the bending point of the measured strain data in the longitudinal direction as a progression position of the debonding.

10. The debonding detecting device according to claim 8, wherein the adhering object and the optical fiber are on a same surface side of the adherent, and the optical fiber sensor is spaced apart from the adhering object.

* * * * *